(12) United States Patent
Jaradi et al.

(10) Patent No.: US 11,891,008 B1
(45) Date of Patent: Feb. 6, 2024

(54) AIRBAG DEPLOYABLE BY PILLAR-MOUNTED PYROTECHNIC DEVICE

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 18/067,094

(22) Filed: Dec. 16, 2022

(51) Int. Cl.
| | | |
|---|---|---|
| *B60R 21/214* | (2011.01) | |
| *B60R 21/232* | (2011.01) | |
| *B60R 21/264* | (2006.01) | |
| *B60R 21/231* | (2011.01) | |
| *B60R 21/00* | (2006.01) | |

(52) U.S. Cl.
CPC .......... *B60R 21/214* (2013.01); *B60R 21/232* (2013.01); *B60R 21/264* (2013.01); *B60R 2021/006* (2013.01); *B60R 2021/23161* (2013.01)

(58) Field of Classification Search
CPC .................................................. B60R 21/214
See application file for complete search history.

(56) References Cited

U.S. PATENT DOCUMENTS

| | | | |
|---|---|---|---|
| 5,470,103 A * | 11/1995 | Vaillancourt | B60R 21/232 280/730.2 |
| 7,195,276 B2 * | 3/2007 | Higuchi | B60R 21/231 280/743.1 |
| 9,321,423 B2 | 4/2016 | Jaradi et al. | |
| 9,744,932 B1 * | 8/2017 | Faruque | B60R 21/16 |
| 9,994,182 B1 | 6/2018 | Jaradi et al. | |
| 10,279,770 B2 | 5/2019 | Faruque et al. | |
| 10,285,880 B1 * | 5/2019 | Ghannam | B60P 7/0892 |
| 10,315,609 B2 * | 6/2019 | Thomas | B60R 21/261 |
| 11,083,650 B2 * | 8/2021 | Salter | B60Q 1/50 |
| 11,325,554 B1 * | 5/2022 | Faruque | B60R 21/01512 |
| 11,345,301 B2 | 5/2022 | Farooq et al. | |
| 11,351,946 B1 * | 6/2022 | Faruque | B60R 21/23138 |
| 11,364,872 B1 * | 6/2022 | Jaradi | B60R 21/214 |
| 11,577,682 B1 * | 2/2023 | Bates | B60R 21/214 |

(Continued)

FOREIGN PATENT DOCUMENTS

| | | | | |
|---|---|---|---|---|
| DE | 102018127440 A1 * | 5/2019 | .......... | A61G 3/0808 |
| DE | 102018129852 A1 * | 5/2019 | .......... | B60R 21/213 |

(Continued)

*Primary Examiner* — Nicole T Verley
(74) *Attorney, Agent, or Firm* — Frank A. MacKenzie; Bejin Bieneman PLC

(57) ABSTRACT

A vehicle includes a vehicle pillar. The vehicle includes a vehicle roof supported by the vehicle pillar. The vehicle includes an airbag supported by the vehicle roof. The airbag has a first side portion, a second side portion spaced cross-vehicle from the first side portion, and a front portion extending from the first side portion to the second side portion. The vehicle includes a pyrotechnic device supported by the vehicle pillar. The pyrotechnic device is coupled to one of the first side portion or the second side portion of the airbag.

20 Claims, 7 Drawing Sheets

(56) References Cited

U.S. PATENT DOCUMENTS

| | | | | |
|---|---|---|---|---|
| 2015/0375704 | A1* | 12/2015 | Jaradi | B60R 21/08 |
| | | | | 280/749 |
| 2019/0202391 | A1* | 7/2019 | Cho | B60R 21/233 |
| 2019/0217804 | A1* | 7/2019 | Cho | B60R 21/233 |
| 2021/0179005 | A1* | 6/2021 | Jayakar | B60R 21/01 |
| 2022/0096289 | A1* | 3/2022 | Jaradi | B60R 16/0207 |
| 2022/0134991 | A1* | 5/2022 | Farooq | B60R 21/214 |
| | | | | 280/730.1 |
| 2022/0203923 | A1* | 6/2022 | Jaradi | B60R 21/214 |
| 2022/0242358 | A1* | 8/2022 | Farooq | A61G 3/0808 |

FOREIGN PATENT DOCUMENTS

| | | | | | |
|---|---|---|---|---|---|
| DE | 102018221787 | A1 | * | 7/2019 | B60R 21/23 |
| DE | 102022109168 | A1 | * | 10/2022 | B60R 21/207 |
| EP | 2777667 | A2 | * | 9/2014 | A61G 3/0808 |
| JP | 2019043474 | A | * | 3/2019 | |
| JP | 2021054100 | A | * | 4/2021 | |
| KR | 20220010190 | A | * | 1/2022 | |
| WO | WO-2019209380 | A1 | * | 10/2019 | B60R 21/214 |
| WO | WO-2020243227 | A1 | * | 12/2020 | B60R 21/013 |
| WO | WO-2021146431 | A1 | * | 7/2021 | A61G 3/0808 |

* cited by examiner

AIRBAG DEPLOYABLE BY PILLAR-MOUNTED PYROTECHNIC DEVICE

BACKGROUND

Vehicles are equipped with airbags. In the event of certain impacts, an inflator activates and provides inflation medium to the airbags, and the airbags pressurize and act as supplemental restraints for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

Figure 1:
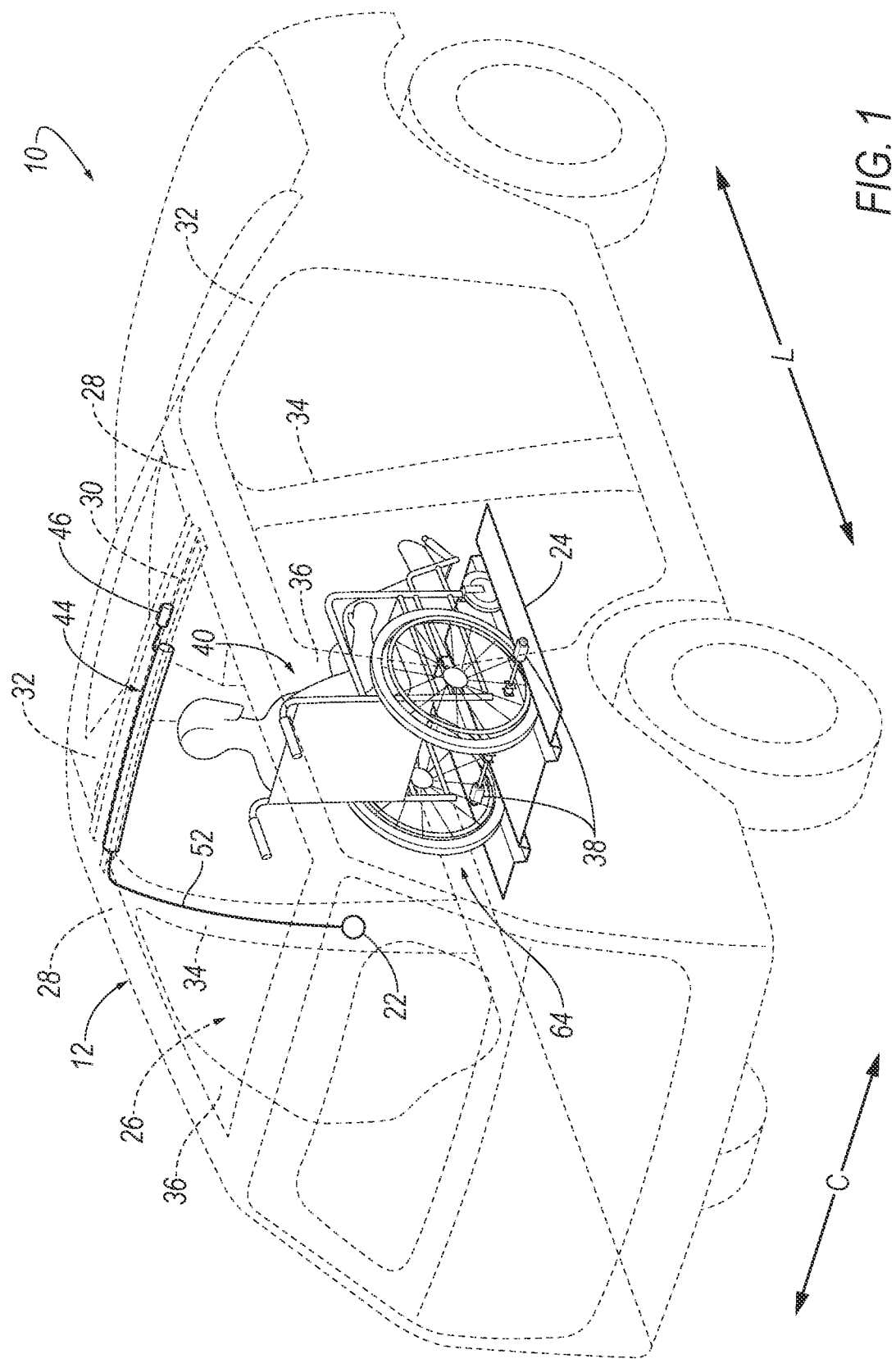
FIG. 1 is a rear perspective view of a vehicle having a first example of an airbag in an uninflated position.

A vehicle includes a vehicle pillar. The vehicle includes a vehicle roof supported by the vehicle pillar. The vehicle includes an airbag supported by the vehicle roof. The airbag has a first side portion, a second side portion spaced cross-vehicle from the first side portion, and a front portion extending from the first side portion to the second side portion. The vehicle includes a pyrotechnic device supported by the vehicle pillar. The pyrotechnic device is coupled to one of the first side portion or the second side portion of the airbag.

The vehicle may include a tether coupling the pyrotechnic device to the airbag. The tether may be retractable by the pyrotechnic device from an elongated position to a retracted position.

The tether may extend from the pyrotechnic device to one of the first side portion or the second side portion of the airbag.

The airbag may be inflatable away from the vehicle roof.

The vehicle may include a strap extending from the first side portion to the second side portion. The strap may be spaced vehicle-rearward from the front portion.

The vehicle may include an occupant seating area between the first side portion and the second side portion. The strap may extend across the occupant seating area.

The vehicle may include an occupant seating area between the first side portion and the second side portion. The front portion may be vehicle-forward of the occupant seating area.

The front portion may extend from the vehicle roof to a distal end. The side portions may be connected to the front portion from the vehicle roof to the distal end.

The front portion may be elongated along a cross-vehicle axis and the first side portion and the second side portion are elongated along a vehicle-longitudinal axis.

The vehicle may include a vehicle floor spaced downwardly from the vehicle roof. The vehicle floor may be designed to support a wheelchair.

The vehicle floor may include latches designed to be engageable with wheels of a wheelchair.

The vehicle may include a second vehicle pillar spaced cross-vehicle from the vehicle pillar. The second vehicle pillar may support the vehicle roof. The vehicle may include a second pyrotechnic device supported by the second vehicle pillar. The second pyrotechnic device may be coupled to the other of the first side portion or the second side portion of the airbag.

The vehicle may include a second tether coupling the second pyrotechnic device to the airbag, the second tether being retractable by the second pyrotechnic device from an elongated position to a retracted position.

The second tether may extend from the second pyrotechnic device to the other of the first side portion or the second side portion of the airbag.

The vehicle roof may include a pair of roof rails spaced cross-vehicle from each other and a roof beam elongated from one roof rail to the other roof rail. The airbag may be supported by the roof beam between the roof rails.

The first side portion may be adjacent one of the roof rails and the second side portion is adjacent the other of the roof rails, the front portion extending from one roof rail to the other roof rail.

The vehicle may include a third side portion between the first side portion and the second side portion. The front portion may extend from the first side portion to the third side portion and from the third side portion to the second side portion.

The vehicle may include a first occupant seating area between the first side portion and the third side portion and a second occupant seating area between the third side portion and the second side portion.

The vehicle roof may include a pair of roof rails spaced cross-vehicle from each other. The front portion may extend from the one roof rail to the other roof rail. The first side portion may be adjacent one of the roof rails and the second side portion being adjacent the other of the roof rails, and the third side portion being between the roof rails.

The vehicle may include a first strap extending from the first side portion to the third side portion and a second strap extending from the third side portion to the second side portion.

With reference to the Figures, wherein like numerals indicate like parts throughout the several views, a vehicle 10 includes a vehicle pillar 32, 34, 36. The vehicle 10 includes a vehicle roof 12 supported by the vehicle pillar 32, 34, 36. The vehicle 10 includes an airbag 14 supported by the vehicle roof 12. The airbag 14 has a first side portion 16, a second side portion 18 spaced cross-vehicle from the first side portion 16, and a front portion 20 extending from the first side portion 16 to the second side portion 18. The vehicle 10 includes a first pyrotechnic device 22 supported by the vehicle pillar 32, 34, 36. The first pyrotechnic device 22 is coupled to one of the first side portion 16 or the second side portion 18 of the airbag 14.

In the event of certain impacts to the vehicle 10, the airbag 14 inflates to control the kinematics of an occupant of the vehicle 10. As the airbag 14 inflates, the first pyrotechnic device 22 activates and pulls the airbag 14 downwardly from the vehicle roof 12. The first pyrotechnic devices 22 pulls the airbag 14 downwardly to surround one or more occupants of the vehicle 10 during the impact. The airbag 14 surrounding the occupant limits interaction with other occupants of the vehicle 10 and vehicle components.

Figure 2:
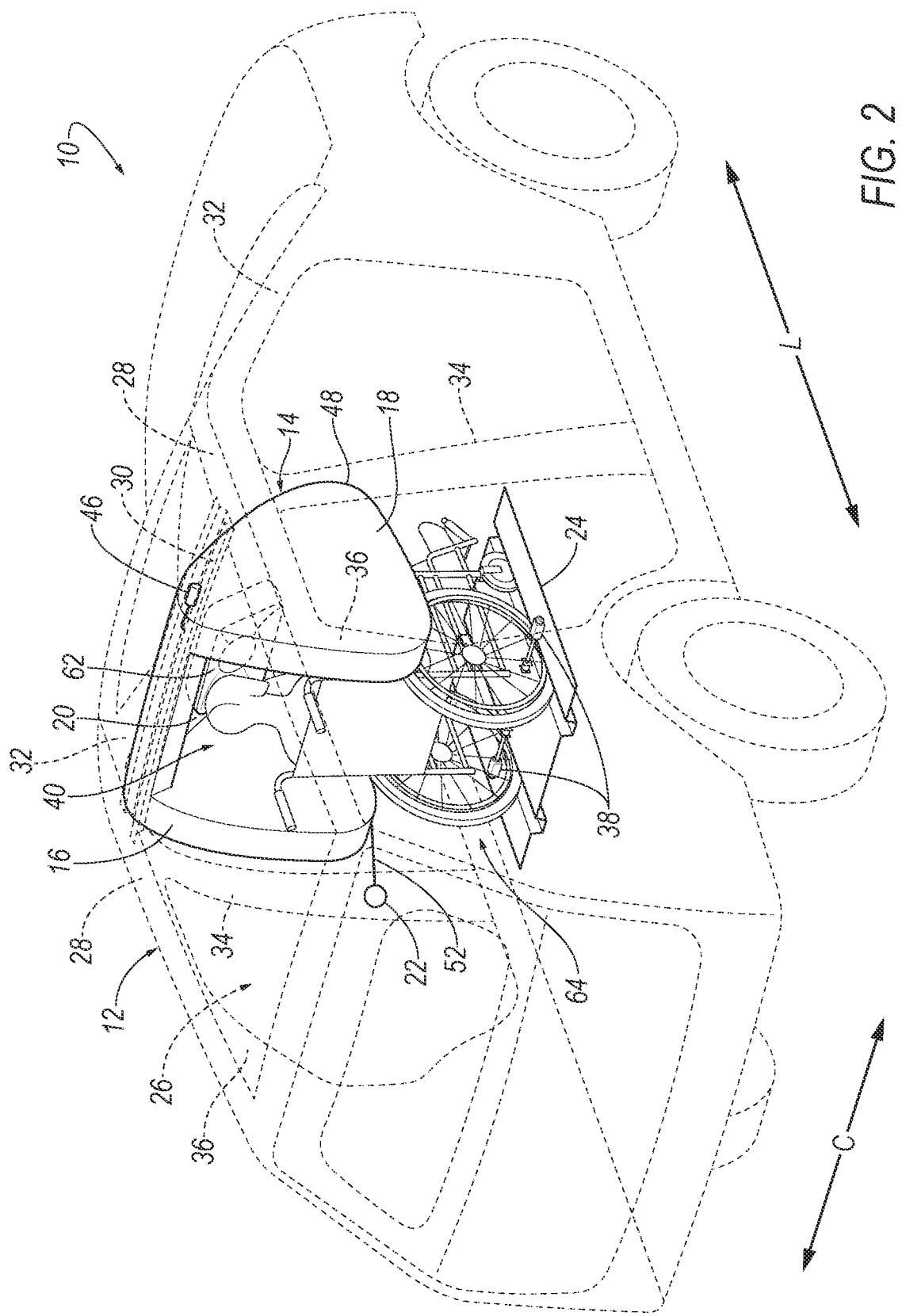
FIG. 2 is a rear perspective view of the vehicle having the first example of the airbag in an inflated position.
Figure 3:
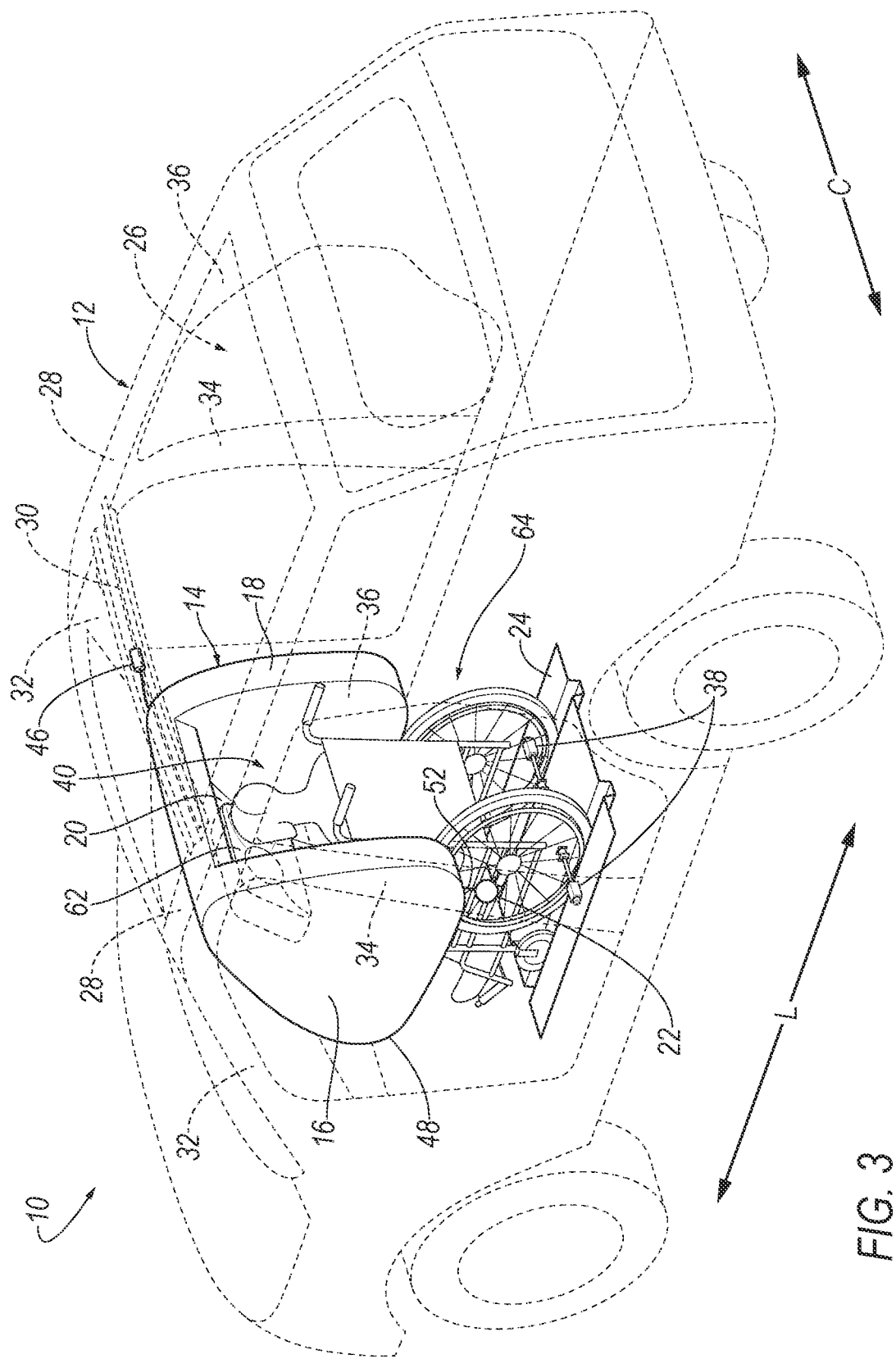
FIG. 3 is a rear perspective view of the vehicle having the first example of the airbag in the inflated position.
Figure 4:
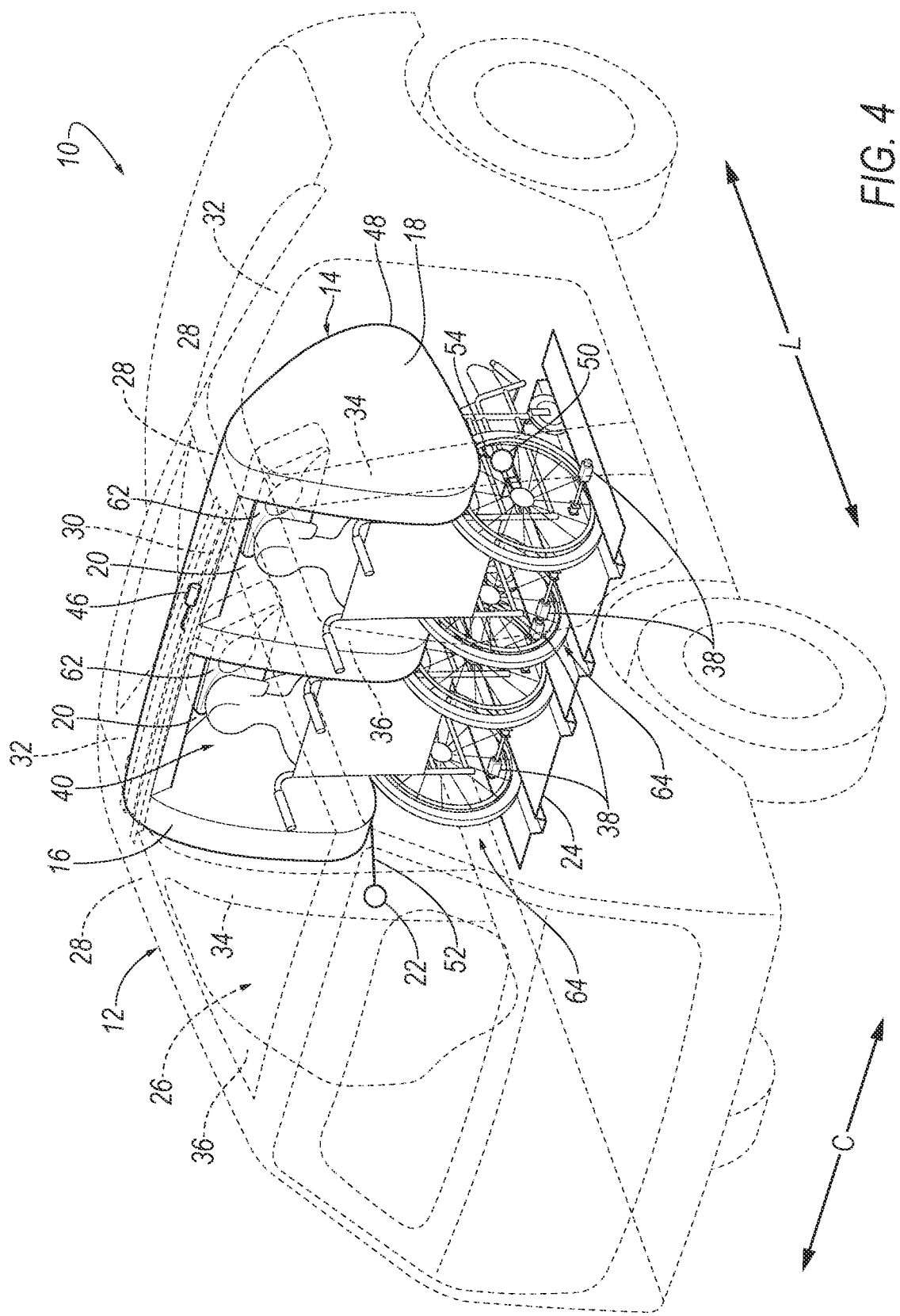
FIG. 4 is a rear perspective view of the vehicle having a second example of the airbag in the inflated position.
Figure 5A:
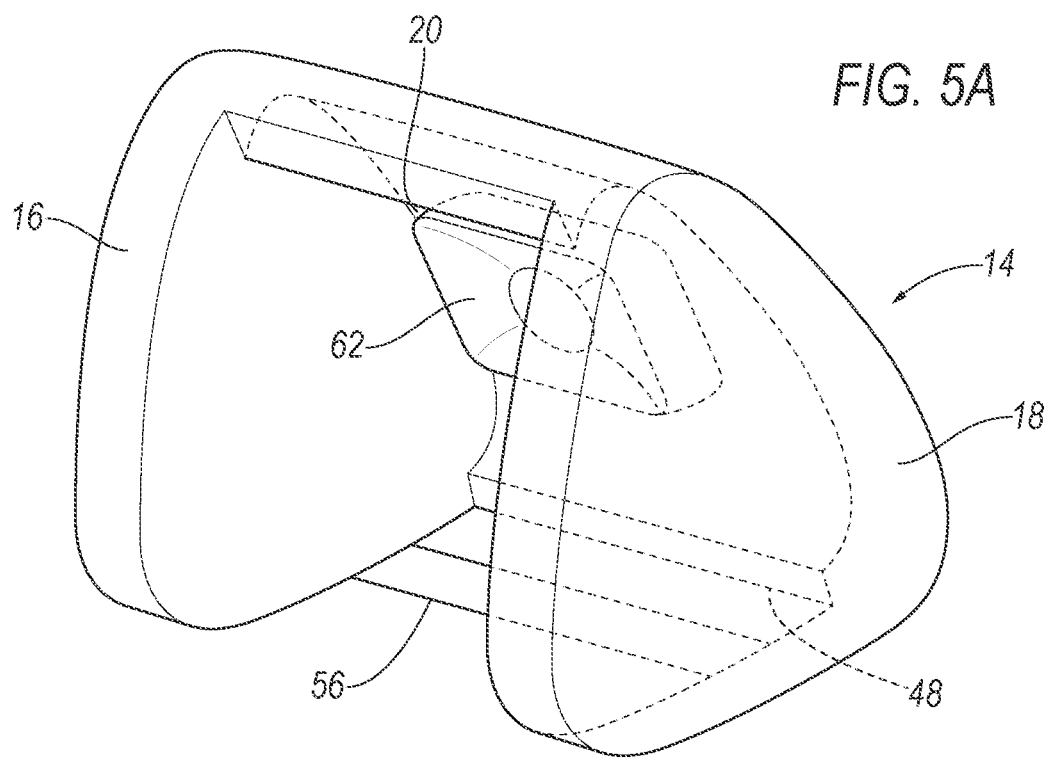
FIG. 5A is a rear perspective view of the first example of the airbag.
Figure 5B:
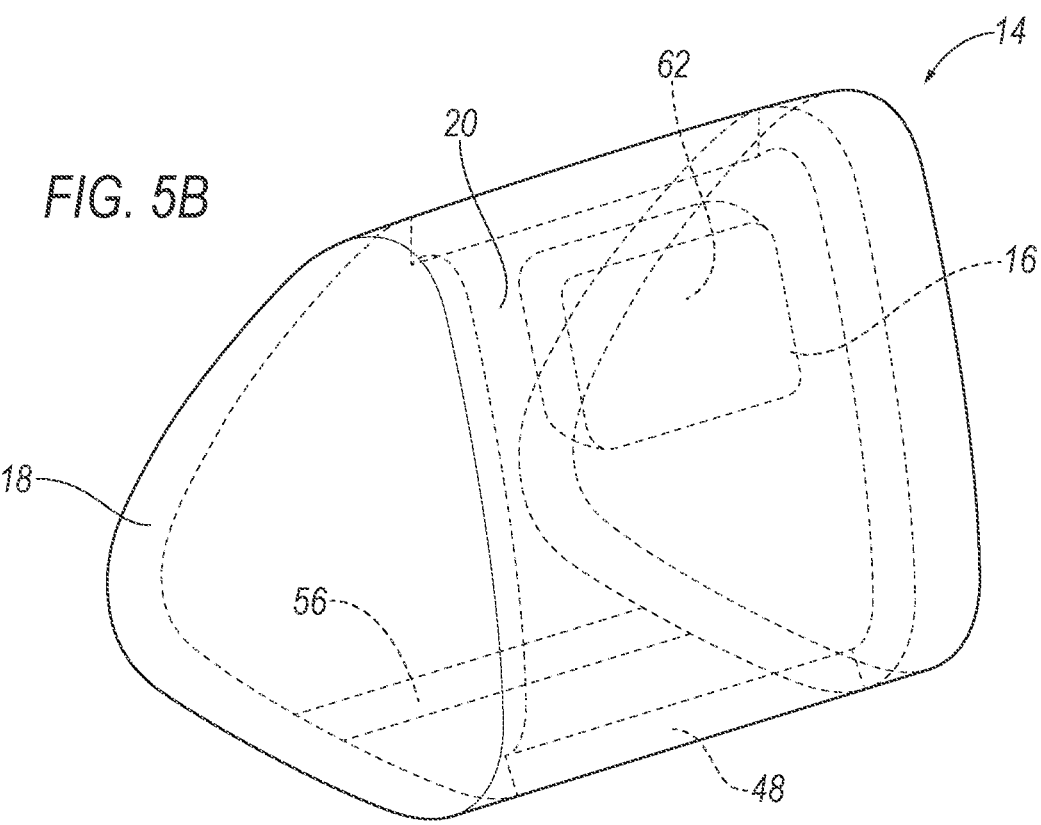
FIG. 5B is a forward perspective view of the first example of the airbag.

Two example embodiments are shown in the Figures and common numerals are used to identify common features in the example embodiments. One example embodiment is shown in FIGS. 2-3 and FIG. 5. In such an example, the airbag 14 includes two side portions 16, 18 extending from the vehicle roof 12. A second example embodiment is shown in FIGS. 4 and 6. In such an example, the airbag 14 includes three side portions 16, 18, 58. In both examples, the airbags 14 surround one or more occupants of the vehicle 10 to control the kinematics of an occupant in the event of certain impacts to the vehicle 10.

With reference to FIGS. 1-4, the vehicle 10 may be any suitable type of ground vehicle, e.g., a passenger or commercial automobile such as a sedan, a coupe, a truck, a sport utility, a crossover, a van, a minivan, a taxi, a bus, etc.

The vehicle 10 may include a vehicle body (not numbered). The vehicle body includes body panels partially defining an exterior of the vehicle 10. The body panels may present a class-A surface, e.g., a finished surface exposed to view by a customer and free of unaesthetic blemishes and defects. The body panels include, e.g., the vehicle roof 12, a vehicle floor 24, etc. As discussed below, the vehicle body includes the vehicle roof 12 and the vehicle floor 24.

The vehicle body, specifically, the vehicle roof 12, includes at least two roof rails 28. The roof rails 28 are cross-vehicle spaced from each other along a cross-vehicle axis C and are generally parallel to each other in a cross-vehicle direction. The roof rails 28 each extend longitudinally along the vehicle body, i.e., along a vehicle-longitudinal axis L of the vehicle body. The vehicle body may include any suitable number of roof rails 28 spaced from one another and extending longitudinally along the vehicle body.

The vehicle body, specifically, the vehicle roof 12, includes at least one roof beam 30. The roof beam 30 extends from one roof rail 28 to the other roof rail 28. The roof beam 30 is irremovably fixed to both roof rails 28 in other words, the roof beam 30 is secured to the roof rails 28 in such a way that removal requires destruction such as cutting, e.g., cutting material and/or welded joints, etc. As an example, the roof beam 30 may be attached to both roof rails 28, e.g., by welding, fasteners, etc. In addition to the at least one roof beam 30, the vehicle body may include any suitable number of roof beams 30 spaced from one another and extending from one roof rail 28 to the other roof rail 28.

The vehicle roof 12 and the vehicle floor 24 are spaced from each other. Specifically, the vehicle floor 24 is spaced downwardly from the vehicle roof 12. The vehicle roof 12 defines the upper boundary of the passenger compartment 26 and may extend from the front end of the passenger compartment 26 to the rear end of the passenger compartment 26. The vehicle roof 12 may include a roof panel (not numbered) extending from one roof rail 28 to the other roof rail 28. The roof panel may be irremovably fixed to the roof rails 28. In other words, the roof panel is secured to the roof rails 28 in such a way that removal requires destruction such as cutting, e.g., cutting material and/or welded joints, etc. As an example, the roof panel may be attached to both roof rails 28, e.g., by welding, fasteners, etc.

The vehicle 10 includes the vehicle floor 24 defines the lower boundary of the passenger compartment 26 and may extend from the front end of the passenger compartment 26 to the rear end of the passenger compartment 26. The vehicle floor 24 may include upholstery, for example, carpet, and may have a class-A surface facing the passenger compartment 26, i.e., a surface specifically manufactured to have a high quality, finished, aesthetic appearance free of blemishes.

The vehicle body may include vehicle pillars 32, 34, 36 spaced from each along the vehicle-longitudinal axis L on both sides of the vehicle body. Specifically, in the example shown in the Figures, the vehicle body includes a front pillar 32, a middle pillar 34 spaced vehicle-rearward from the front pillar 32, and a rear pillar 36 spaced vehicle-rearward from the middle pillar 34. The vehicle 10 includes a set of vehicle pillars 32, 34, 36 on each side of the vehicle body. For example, the vehicle body includes a front pillar 32, a middle pillar 34, and a rear pillar 36 on each side of the vehicle 10 with the vehicle pillars 32, 34, 36 being spaced from each other along the vehicle-longitudinal axis L. In other words, the front pillar 32 may be disposed at the front end of the passenger compartment 26, the rear pillar 36 may be disposed at the rear end of the passenger compartment 26, and the middle pillar 34 between the front pillar 32 and the rear pillar 36. The vehicle pillars 32, 34, 36, on both sides of the vehicle 10, may extend from the vehicle roof 12 to the vehicle floor 24 to support the vehicle roof 12. The vehicle 10 may include other vehicle pillars 32, 34, 36 in addition to the front pillar 32, the middle pillar 34, and the rear pillar 36.

In the examples shown in FIGS. 1-4, including both example embodiments, the vehicle floor 24 is designed to support a wheelchair 64. Specifically, the vehicle 10 is designed to accommodate one or more wheelchairs 64 in the passenger compartment 26. For example, as shown in the Figures, the vehicle 10 may accommodate two wheelchairs 64 near the front end of the passenger compartment 26. In such examples, the vehicle floor 24 may include latches 38 designed to be engageable with wheel of a wheelchair 64 to limit movement of the wheelchair 64 along the vehicle floor 24 when the vehicle 10 is in motion. The vehicle 10, e.g., the vehicle floor 24, may be designed to accommodate any suitable number of wheelchairs 64 in the passenger compartment 26.

In examples designed to support a wheelchair 64, the vehicle 10 may include one or more latches 38 supported by the vehicle floor 24. The latches 38 secures the wheels of a wheelchair 64 when the wheelchair 64 is disposed in the passenger compartment 26. The latches 38 are positioned adjacent such that the latches 38 engage a wheel of the wheelchair 64. The assembly may include any suitable number of latches 38 to secure the wheels of the wheelchair 64 and limit the movement of the wheelchair 64 in the passenger compartment 26. For example, the number of latches 38 may be equal to the number of wheels of the wheelchair 64. In the example shown in the Figures, the vehicle 10 includes four latches 38, one latch 38 for each of the four wheels of the wheelchair 64.

The latches 38 are moveable between an unlatched position and a latched position. When the latches 38 are in the unlatched position, the latches 38 are retracted from the wheels of the wheelchair 64, i.e., the latch 38 is drawn away from the wheels when the latch 38 is in the unlatched position. In the unlatched position, the wheels of the wheelchair 64 may be free to roll and/or move along the floor. When the latches 38 are in the latched position, the latches 38 are elongated across the wheels. In the latched position, the wheels of the wheelchair 64 are unable to roll and/or more along the floor.

In the latched position, the latches 38 are designed to extend through a wheel of a wheelchair 64 adjacent the latch 38. The latches 38 elongate through the wheel of the wheelchair 64 when in the latched position. The wheel of the wheelchair 64 may include spokes. The latch 38 limits the rolling and movement of the wheels of the wheelchair 64 by extending through the wheel, i.e., between the spokes.

The latches 38 may be manual. In other words, the latches 38 may be manually moved from the unlatched position to the latched position by an occupant of the vehicle 10. In such an example, the latch 38 may include a hook (not numbered) and an eye (not numbered) mounted to the vehicle floor 24. The hook may be on one side of the wheel and the eye may extend through the wheel of the wheelchair 64 from the other side of the wheel. The latch 38 may include a handle (not numbered) connected to the eye to move the eye through the wheel of the wheelchair 64 to the hook. The eye is looped around the hook and moved into the latched position by pressing the handle toward the top surface of the vehicle floor 24. The hook may be spring loaded, i.e., when in the latched position, a spring pulls the eye to ensure that the latch 38 remains in the latched position when the vehicle 10 is in use.

In another example, the latches 38 may be electronic. In such an example, the latch 38 includes a solenoid. The solenoid includes a body mounted to the panel and a post extendable from the body. The body of the solenoid may be disposed on the vehicle floor 24.

In other examples, such as examples not shown in the Figures, the vehicle 10 may include one or more seats (not shown) supported by the vehicle floor 24. In examples including seats, the seats may be arranged in any suitable arrangement in the passenger compartment 26. One or more of the seats may be at the front end of the passenger compartment 26, e.g., a driver seat and/or a passenger seat. In other examples, one or more of the seats may be behind the front end of the passenger compartment 26, e.g., at the rear end of the passenger compartment 26. The seats may be movable relative to the vehicle floor 24 to various positions, e.g., movable fore-and-aft and/or cross-vehicle. The seat may be of any suitable type, e.g., a bucket seat.

The vehicle body includes doors (not numbered). The doors are openable for occupants to enter and exit a passenger compartment 26. The roof rails 28 contact a top edge of the doors. Each door may include a door trim, a door frame, and a door panel. The door trim and the door panel are fixed relative to the door frame. The door trim is inboard relative to the door frame, and the door panel is outboard relative to the door frame. The door includes a window opening completely closed by the window when the window is in a fully raised position. The window opening may be defined by the door trim and door panel on a bottom edge and either by the door circumscribing the window opening or by the body, e.g., a pillar, and the roof rail 28. The door panel faces outboard relative to the vehicle 10.

In either example discussed above, i.e., with or without seats, the passenger compartment 26 defines one or more occupant seat areas. The occupant seating area is the area of the passenger compartment 26 occupied by an occupant when properly seated in the vehicle 10. In the embodiments shown in the Figures, the occupant seating areas 40, 42 are the areas of the passenger compartment 26 occupant by an occupant when properly seated in a wheelchair 64 in the vehicle 10. In the example embodiments shown in the Figures, the passenger compartment 26 defines at least a first occupant seat area and a second occupant seating area 42. The first occupant seating area 40 is the area occupied by an occupant of a wheelchair 64 in a location typically occupied by a driver in a driver seat. The second occupant seating area 42 is the area occupied by an occupant of a wheelchair 64 in a location typically occupied by a passenger of a passenger seat in at the front end of the passenger compartment 26. The passenger compartment 26 may define any suitable number of occupant seating areas 40, 42. Specifically, the number of occupant seating areas 40, 42 defined by the passenger compartment 26 depends on the number of occupants the vehicle 10 may accommodate. In the examples shown in the Figures, the number of occupant seating areas 40, 42 depends on the number of wheelchairs 64 that may be accommodated by the passenger compartment 26.

With continued reference to FIGS. 1-4, the vehicle 10 includes one or more airbag assembly 44. The airbag assembly 44 includes the airbag 14, an inflator 46, and may include a housing (not shown). The vehicle 10 may include any suitable number of airbag assemblies 44. As one example, the vehicle 10 may include an airbag assembly 44 corresponding to each of the occupant seating areas 40, 42. In other words, as shown in FIG. 2-3, the vehicle 10 may include one or more airbag assemblies 44. In the example shown in FIG. 4, the vehicle 10 may include one airbag assembly 44 that is elongated across an entire row of occupant seating areas 40, 42, e.g., the first occupant seating area 40 and the second occupant seating area 42. In examples including more than one airbag assembly 44, the airbag assemblies 44 may be identical or substantially identical to each other.

The inflator 46 is in fluid communication with the airbag 14. The inflator 46 expands the airbag 14 with inflation medium, such as a gas, to move the airbag 14 from an uninflated position to an inflated position. The inflator 46 may be supported by any suitable component. For example, the inflator 46 may be supported by the housing. The inflator 46 may be, for example, a pyrotechnic inflator that ignites a chemical reaction to generate the inflation medium, a stored gas inflator that releases e.g., by a pyrotechnic valve stored gas as the inflation medium, or a hybrid. The inflator 46 may be, for example, at least partially in the inflation chamber to deliver inflation medium directly to the inflation chamber or may be connected to the inflation chamber through fill tubes, diffusers, etc.

The airbag assembly 44 is supported by the vehicle roof 12. Specifically, the airbag 14 is supported by the vehicle roof 12. The airbag 14 is supported by the roof beam 30 of the vehicle roof 12. The airbag 14 is supported by the roof beam 30 between the roof rails 28. In other words, the airbag 14 is above the passenger compartment 26. The airbag 14 may be supported by the roof beam 30 in any suitable way. The airbag 14 may be mounted to the roof beam 30 to limit the movement of the airbag 14 in the inflated position. The airbag 14 may be, for example, mounted by fasteners, welds, etc.

With reference to FIG. 1, in the uninflated position, the airbag 14, i.e., the airbag assembly 44, may be concealed behind vehicle components, e.g., a headliner (not numbered). The vehicle 10 component, e.g., the headliner, may include a tear seam (not shown) that is frangible relative to the airbag 14. As the airbag 14 moves to the inflated position, the tear seam may break to allow the airbag 14 to pass through the headliner and reach the inflated position. As the airbag 14 moves from the uninflated position to the inflated position, the airbag 14 is inflatable away from the vehicle roof 12 and the roof beam 30. In other words, the airbag 14 inflates downwardly from the vehicle 10 as the airbag 14 moves toward the inflated position. The airbag 14 surrounds one or more occupants of the vehicle 10 to limits the occupant's interaction with other occupants of the vehicle 10 and vehicle components.

With reference to FIGS. 2-6, the airbag 14 includes a plurality of portions 16, 18, 20, 58 in fluid communication with each other. Specifically, the airbag 14 includes a front portion 20 and side portions 16, 18, 58 spaced cross-vehicle from each other. As discussed below, the example shown in FIGS. 2, 3, 5A, and 5B, the airbag 14 includes two side portions 16, 18. The example shown in FIGS. 4, 6A, and 6B includes three side portions 16, 18, 58. As the airbag 14 moves toward the inflated position, the front portion 20 inflates downwardly from the vehicle roof 12. In the inflated position, the front portion 20 extends downwardly from the vehicle roof 12 to a distal end 48. The front portion 20 extends at least from one side portion to another side portion along the cross-vehicle axis C. Specifically, the front portion 20 is elongated along the cross-vehicle axis C from one side portion to another second side portion 18. The side portions 16, 18, 58 are connected to the front portion 20 from the vehicle roof 12 to the distal end 48. The front portion 20 is elongated vehicle-forward from one or more of the occupant seat areas in the inflated position. In other words, the front portion 20 of the airbag 14 is in front of the occupant when the airbag 14 is in the inflated position. Specifically, the distal end 48 of the front portion 20 is vehicle-forward of one or more of the occupant seating areas 40, 42 when the airbag 14 is in the inflated position. The distal end 48 may be spaced vehicle-forward of one or more of the occupant seating areas 40, 42 when the airbag 14 is in the inflated position.

The airbag 14 may include an extension 62 supported by the front portion 20. The extension 62 may control the kinematics of the head of the occupant in the event of certain impacts to the vehicle 10. The extension 62 may be supported by an inner panel (not numbered) of front portion 20 between the side portions 16, 18 of the airbag 14. The extension 62 may face toward the occupant seating area 40, 42. Specifically, the extension 62 may be between the occupant seating area 40, 42 and the front portion 20 of the airbag 14 when the airbag 14 is in the inflated position.

The side portions 16, 18, 58 are spaced cross-vehicle from each other along the cross-vehicle axis C. Specifically, the side portions 16, 18, 58 may be spaced from each other by the front portion 20 because the front portion 20 extends from one side portion to another side portion as discussed above. The side ports are elongated transverse to the front portion 20 of the airbag 14. Specifically, the side portions 16, 18, 58 are elongated along the vehicle-longitudinal axis L. In other words, the side ports are elongated in a vehicle-fore-and-aft direction, i.e., front to rear in the passenger compartment 26. The side portions 16, 18, 58 may be elongated along each side of one or more occupant seating area. Specifically, the side portions 16, 18, 58 may be spaced from each other by one or more of the occupant seating areas 40, 42. In other words, one or more of the occupant seating areas 40, 42 is between the side portions 16, 18, 58 when the airbag 14 is in the inflated position.

The airbag 14 may include internal tethers (not shown) to maintain the shape of the airbag 14. For example, the side portions 16, 18, 20, 58 may include internal tethers elongated between inner panels (not numbered) and outer panels (not numbered) to maintain the shape and distance between the inner panels and outer panels.

The vehicle 10 includes the first pyrotechnic device 22 supported by one of the vehicle pillars 32, 34, 36. Specifically, the first pyrotechnic device 22 is supported by one of the vehicle pillars 32, 34, 36 nearest the airbag 14. For example, the first pyrotechnic device 22 is supported by one of the middle pillars 34 as shown in the Figures. In other examples, the first pyrotechnic device 22 may be supported by a suitable vehicle pillar 32, 34, 36. The first pyrotechnic device 22 may be concealed by trim panels supported by the middle pillar 34. The first pyrotechnic device 22 is coupled to one of the side portions 16, 18 of the airbag 14. Specifically, the first pyrotechnic device 22 is operatively coupled to the side portions 16, 18. The first pyrotechnic device 22 may be activated in the event of certain impacts to the vehicle 10. When the first pyrotechnic device 22 activates, the first pyrotechnic device 22 may pull the side portion of the airbag 14 downwardly from the vehicle roof 12 to aid in the inflation of the airbag 14 and to allow the airbag 14 to surround the occupant in the occupant seating area.

The pyrotechnic device 22 may be coupled to one of the side portions 16, 18 in any suitable way. For example, such as shown in the Figures, the vehicle 10 may include a first tether 52 coupling the pyrotechnic device 22 to the airbag 14, specifically, one of the side portions 16, 18 of the airbag 14. The tether 52 extends from the pyrotechnic device 22 to one of the side portions 16, 18 of the airbag 14. The tether 52 may be routed upwardly along the vehicle pillars 32, 34, 36 and along the roof beam 30 to the airbag 14 when the airbag 14 is in the uninflated position. The tether 52 may be concealed behind trim panels of the middle pillars and the vehicle roof 12, e.g., trim and headliner. The trim and headliner may have, for example, tear seams (not shown) to allow the tether 52 to move the airbag 14 downwardly from the vehicle roof 12.

The tether 52 may be retractable by the pyrotechnic device 22 from an elongated position to a retracted position. Specifically, the tether 52 is retractable from the elongated position to the retracted position as the airbag 14 moves from the uninflated position to the inflated position. The tether 52 is in the elongated position when the airbag 14 is in the uninflated position and the tether 52 is in the retracted position when the airbag 14 is in the inflated position. In other words, as the airbag 14 moves to the inflated position, the length of the tether 52 changes. Specifically, the length of the tether 52 may shorten as the tether 52 is retracted by the pyrotechnic device 22.

The pyrotechnic device 22 includes a pyrotechnic charge that activates to move one of the side portions 16, 18 downwardly from the vehicle roof 12 to the inflated position. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

The pyrotechnic device 22 may be any suitable type such as a rotary pyrotechnic device, in which the pyrotechnic charge rotates a shaft connected to the tether such that the tether wraps around the shaft; a piston linkage, in which the pyrotechnic charge for example, drives a piston attached to the cable; a ball-in-tube linkage, in which an pyrotechnic charge propels a ball or balls over a cogwheel connected to the cable; a mechanical linkage, in which a compressed spring attached to the cable is released; or any other suitable type.

The airbag 14 may include a strap 56 extending from one side portion 18, 20, 58 to another side portion 18, 20, 60. As the airbag 14 moves to the inflated position, the strap 56 connects the side portions 16, 18, 58 to allow the side portions 16, 18, 58 to move downwardly from the vehicle roof 12 at the same rate. In other words, the straps 56, 60 allows the side portions 16, 18, 58 to move to both sides of one or more occupant seating areas 40, 42 simultaneously. The strap 56 may be connected at bottoms of the side portions 16, 18, 58 to extend across one or more occupant seating area. Specifically, the strap 56 may extend across a lap of the occupant when the airbag 14 is in the inflated position. The strap 56 may be spaced vehicle-rearward of the front portion 20 of the airbag 14 to extend across one or more occupant seating area. The strap 56 may be connected to the side portions 16, 18, 58 in any suitable way, e.g., stitching, sonic welding, etc. The strap 56 may, in addition to the pyrotechnic device 22, allow the side portions 16, 18, 58 to simultaneously move downwardly from the vehicle roof 12.

The airbag 14 may surround an occupant on at least three sides. In other words, the side portions 16, 18, 58 are on each side of the occupant and the front portion 20 is in front of the occupant when the airbag 14 is in the inflated position. The airbag 14 may have a general U-shape to surround the occupant in the event of certain impacts to the vehicle 10.

In the example shown in FIGS. 2, 3, 5A, and 5B, the airbag 14 includes two side portions 16, 18. Specifically, the airbags 14 includes a first side portion 16 and a second side portion 18 spaced cross-vehicle from the first side portion 16. In such an example, the front portion 20 extends from the first side portion 16 to the second side portion 18. The first side portion 16 extends downwardly from the vehicle roof 12 adjacent one of the roof rails 28. The first side portion 16 may be adjacent one of the doors and the second side portion 18 is spaced cross-vehicle and toward the center of the vehicle 10.

In the example shown in FIGS. 2, 3, 5A, and 5B, the first pyrotechnic device 22 is coupled to the first side portion 16. The first tether 52 extends from the first pyrotechnic device 22 to the first side portion 16. As the airbag 14 inflates, the first pyrotechnic device 22 activates to retract the first tether 52 and pull the first side portion 16 downwardly from the vehicle roof 12.

With continued reference to the example shown in FIGS. 2, 3, 5A, and 5B, the first occupant seat area is between the first side portion 16 and the second side portion 18. In other words, one of the occupant seat areas is between the first side portion 16 and the second side portion 18. The vehicle 10 may include multiple airbags 14 of this type of example at different occupant seat areas of the vehicle 10. For example, the airbag 14 having two side portions 16, 18 may surround the first occupant area and a second airbag 14 having two side portions 16, 18 may surround the second occupant seating area 42. The strap 56 may extend from the first side portion 16 to the second side portion 18 and across the respective occupant seating area.

Figure 6A:
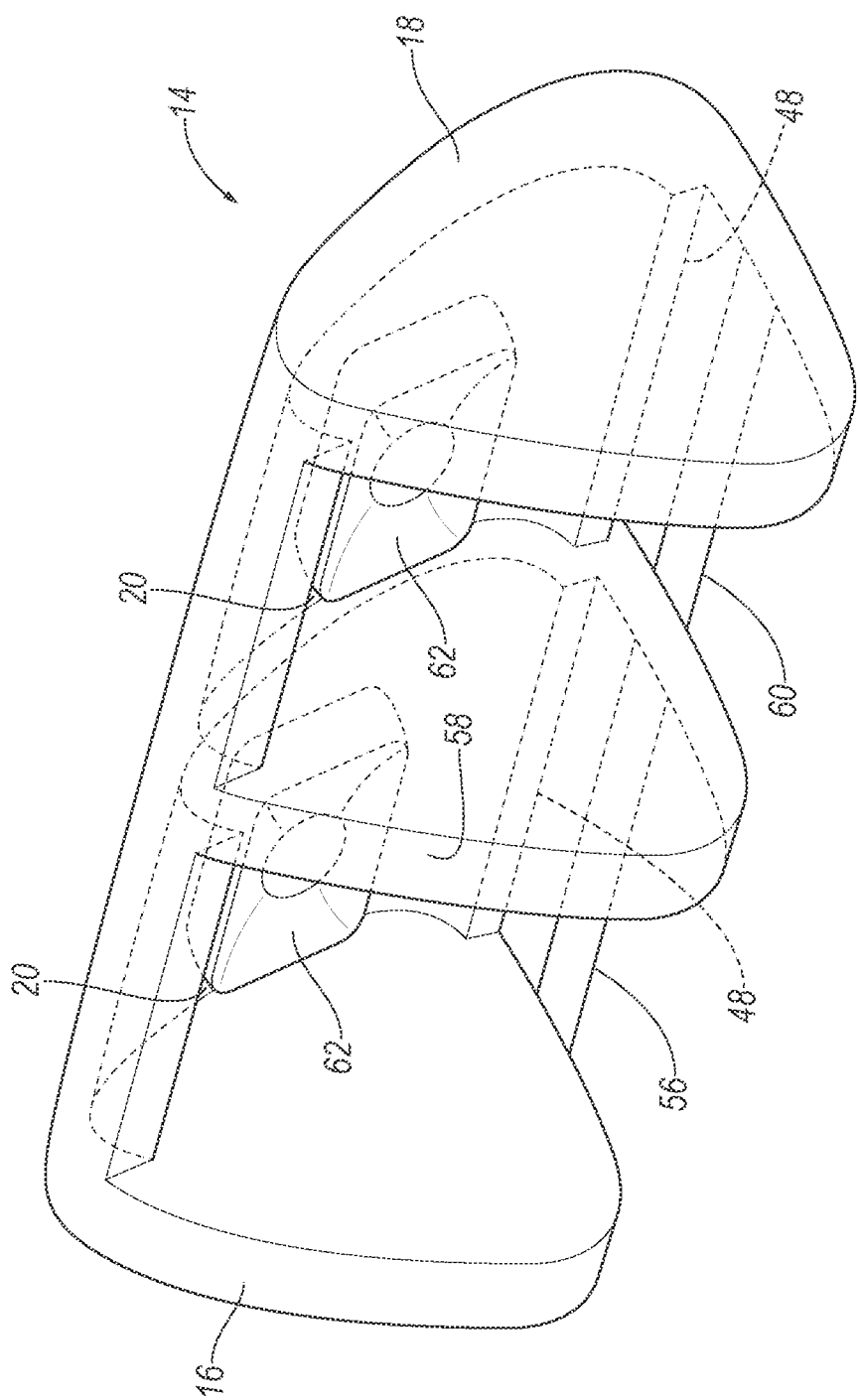
FIG. 6A is a rear perspective view of the second example of the airbag.
Figure 6B:
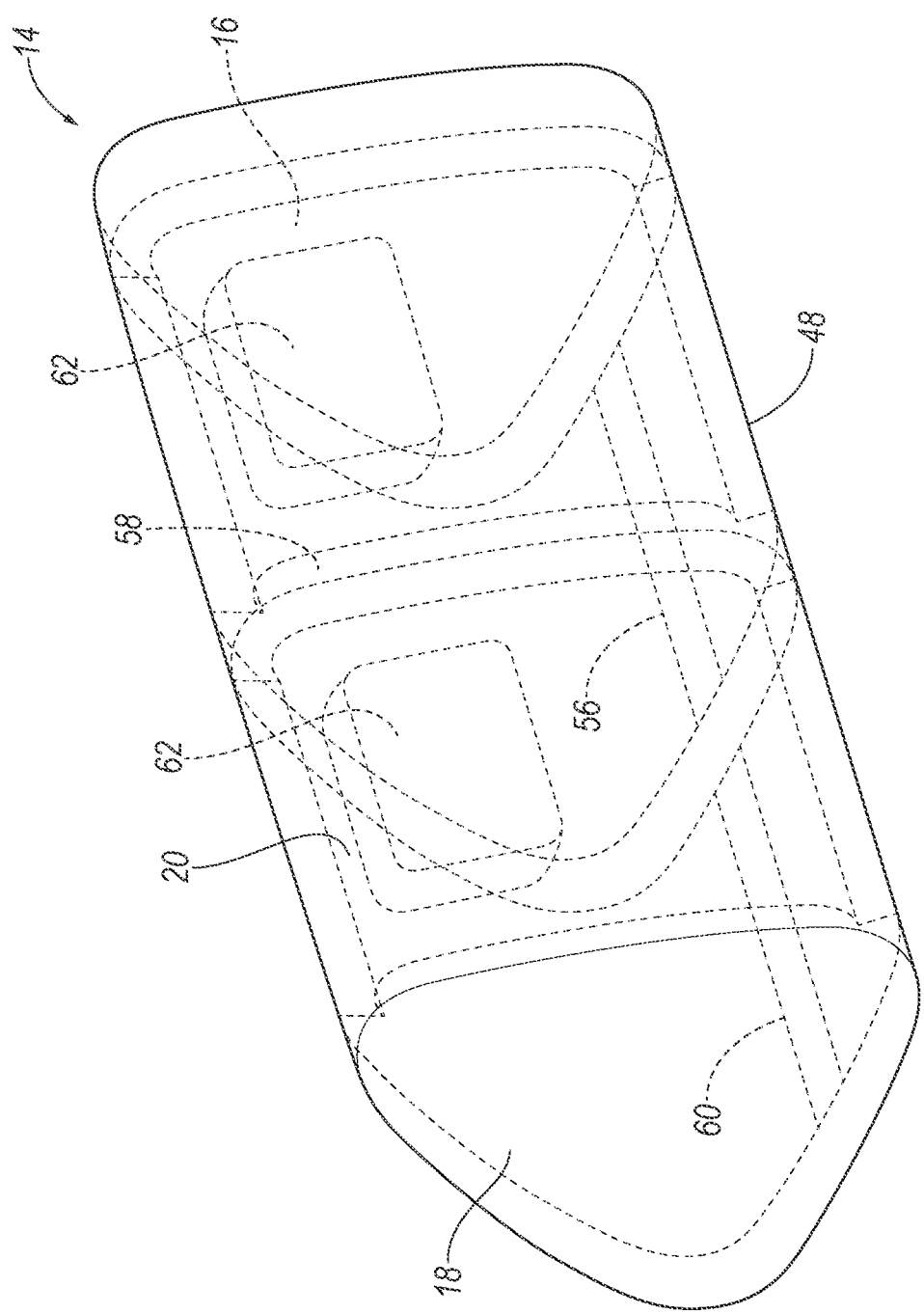
FIG. 6B is a forward perspective view of the second example of the airbag.

In the example shown in FIGS. 4, 6A and 6B, the airbag 14 includes a first side portion 16, a second side portion 18 spaced cross-vehicle from the first side portion 16, and a third side portion 58 between the first side portion 16 and the second side portion 18. The first side portion 16 extends downwardly from the vehicle roof 12 adjacent one of the roof rails 28 and the second side portion 18 extends downwardly from the vehicle roof 12 adjacent the other of the roof rails 28. The third side portion 58, as shown in FIG. 4, is between the roof rails 28 and between the first side portion 16 and the second side portion 18.

In the example shown in FIGS. 4, 6A and 6B, the third side portion 58 is between the first occupant seating area 40 and the second occupant seating area 42. Specifically, the airbag 14 having the first side portion 16, the second side portion 18, and the third side portion 58 may surround multiple occupant seating areas 40, 42 at one time. In other words, the first side portion 16, the third side portion 58 and the front portion 20 surround the first occupant seating area 40 and the third side portion 58, second side portion 18, and the front portion 20 surround the second occupant seating area 42. In other words, the first occupant seating area 40 is between the first side portion 16 and the third side portion 58 and the second occupant seating area 42 is between the third side portion 58 and the second side portion 18. The front portion 20 extends from the first side portion 16 to the third side portion 58 and from the third side portion 58 to the second side portion 18. In other words, in such an example, the front portion 20 extends completely across the passenger compartment 26 from one roof rail 28 to the other roof rail 28. The airbag 14 may include any suitable number of side portions 16, 18, 58.

The airbag 14 includes a pair of extensions 62 supported by the front portion 20. The extensions 62 are between the front portion 20 and the occupant seating areas 40, 42. One extension 62 is between the first side portion 16 and the third side portion 58 and another extension 62 is between the third side portion 58 and the second side portion 18.

With continued reference to FIGS. 4, 6A and 6B, the vehicle 10 may include a second pyrotechnic device 50 supported by another vehicle pillar 32, 34, 36 of the vehicle 10 opposite the vehicle pillar 32, 34, 36 that supports the first pyrotechnic device 22. In such an example, the first pyrotechnic device 22 is supported by the middle pillar 34 on one side of the vehicle 10 and the second pyrotechnic device 50 may be supported by the middle pillar 34 on the opposite side of the vehicle 10. The second pyrotechnic device 50 may be coupled to another of the side portions 16, 18. In other words, the first pyrotechnic device 22 is coupled to one of side portions 16, 18 and the second pyrotechnic device 50 is coupled to another of the side portions 16, 18 that is different from the first pyrotechnic device 22. The second pyrotechnic device 50 is operatively coupled to one of the side portions 16, 18. Simultaneously with the first pyrotechnic device 22, the second pyrotechnic device 50 may be activated in the event of certain impacts to the vehicle 10. When the second pyrotechnic device 50 activates, the second pyrotechnic device 50 may pull the side portion of the airbag 14 downwardly from the vehicle roof 12 to aid in the inflation of the airbag 14 and to allow the airbag 14 to surround the occupant in the occupant seating area. In other words, the pyrotechnic devices 22, 50 pulls down one of the side portions 16, 18 and the second pyrotechnic device 50 pulls down another of the side portions 16, 18 simultaneously. The second pyrotechnic device 50 in the example shown in FIGS. 4 and 6 may be identical to the first pyrotechnic device 22.

Each of the pyrotechnic devices 22, 50 may be coupled to one of the side portions 16, 18 in any suitable way. For example, such as shown in FIGS. 4 and 6, the vehicle 10 may include the first tether 52 and a second tether 54 coupling the pyrotechnic devices 22, 50 to the airbag 14, specifically, the side portions 16, 18 of the airbag 14. The tethers 52, 54 extend from the pyrotechnic devices 22, 50 to the side portions 16, 18 of the airbag 14. The tethers 52, 54 may be routed upwardly along the vehicle pillars 32, 34, 36 and along the roof beam 30 to the airbag 14 when the airbag 14 is in the uninflated position. The tethers 52, 54 may be concealed behind trim panels of the middle pillars and the vehicle roof 12, e.g., trim and headliner. The trim and headliner may have, for example, tear seams (not shown) to allow the tethers 52, 54 to move the airbag 14 downwardly from the vehicle roof 12.

The tethers 52, 54 may be retractable by the pyrotechnic devices 22, 50 from an elongated position to a retracted position. Specifically, the tethers 52, 54 is retractable from the elongated position to the retracted position as the airbag 14 moves from the uninflated position to the inflated position. The tethers 52, 54 is in the elongated position when the airbag 14 is in the uninflated position and the tethers 52, 54 is in the retracted position when the airbag 14 is in the inflated position. In other words, as the airbag 14 moves to the inflated position, the length of the tethers 52, 54 changes. Specifically, the length of the tethers 52, 54 may shorten as the tethers 52, 54 is retracted by the pyrotechnic devices 22, 50.

The example shown in FIGS. 4, 6A and 6B includes a pair of straps 56, 60, the first strap 56 and a second strap 60, that each extend across occupant seating areas 40, 42. The first strap 56 extends from the first side portion 16 to the third side portion 58 and the second strap 60 extending from the third side portion 58 to the second side portion 18. Specifically, the first strap 56 extends across the first occupant seating area 40 and the second strap 60 extends across the second occupant seating area 42. The first strap 56 and the second strap 60 allow the first side portion 16, the second side portion 18, and the third side portion 58 to all move downwardly and simultaneously away from the vehicle roof 12 as the airbag 14 moves to the inflated position.

The airbag 14 and straps 56, 60 may be fabric, e.g., a woven polymer. As an example, the airbag 14 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. The numerical adverbs "first," "second," and "third" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
a vehicle pillar;
a vehicle roof supported by the vehicle pillar;
a passenger compartment including an occupant seating area for a wheelchair;
an airbag supported by the vehicle roof and inflatable to an inflated position, the airbag in the inflated position having a first side portion extending from the vehicle roof, a second side portion extending from the vehicle roof and spaced cross-vehicle from the first side portion, and a front portion extending from the first side portion to the second side portion, the occupant seating area being between the first side portion and the second side portion, the front portion being above the occupant seating area and extending from the roof vehicle-forward of the occupant seating area;
each of the first side portion and the second side portion having a bottom spaced downwardly from the roof in the inflated position;
a pyrotechnic device supported by the vehicle pillar, the pyrotechnic device being coupled to one of the first side portion or the second side portion of the airbag;
a vehicle floor spaced downwardly from the vehicle roof, the vehicle floor being designed to support a wheelchair;
the vehicle floor including latches below the occupant seating area, the latches the designed to be engageable with wheels of a wheelchair in the occupant seating area; and
a strap extending across the occupant seating area from the bottom of the first side portion to the bottom of the second side portion, the strap being spaced vehicle-rearward from the front portion.

2. The vehicle of claim 1, further comprising a tether coupling the pyrotechnic device to the airbag, the tether being retractable by the pyrotechnic device from an elongated position to a retracted position.

3. The vehicle of claim 2, wherein the tether extends from the pyrotechnic device to one of the first side portion or the second side portion of the airbag.

4. The vehicle of claim 1, wherein the airbag is inflatable away from the vehicle roof.

5. The vehicle of claim 1, wherein the airbag defines a space between the strap and the front portion of the airbag.

6. The vehicle of claim 1, wherein the front portion extends from the vehicle roof to a distal end, the side portions being connected to the front portion from the vehicle roof to the distal end.

7. The vehicle of claim 1, wherein the front portion is elongated along a cross-vehicle axis and the first side portion and the second side portion are elongated along a vehicle-longitudinal axis.

8. The vehicle of claim 1, further comprising:
a second vehicle pillar spaced cross-vehicle from the vehicle pillar, the second vehicle pillar supporting the vehicle roof; and
a second pyrotechnic device supported by the second vehicle pillar, the second pyrotechnic device being coupled to the other of the first side portion or the second side portion of the airbag.

9. The vehicle of claim 8, further comprising a second tether coupling the second pyrotechnic device to the airbag, the second tether being retractable by the second pyrotechnic device from an elongated position to a retracted position.

10. The vehicle of claim 9, wherein the second tether extends from the second pyrotechnic device to the other of the first side portion or the second side portion of the airbag.

11. The vehicle of claim 1, wherein the vehicle roof includes a pair of roof rails spaced cross-vehicle from each other and a roof beam elongated from one roof rail to the other roof rail, the airbag being supported by the roof beam between the roof rails.

12. The vehicle of claim 11, wherein the first side portion is adjacent one of the roof rails and the second side portion is adjacent the other of the roof rails, the front portion extending from one roof rail to the other roof rail.

13. The vehicle of claim 1, further comprising a third side portion between the first side portion and the second side portion, the front portion extending from the first side portion to the third side portion and from the third side portion to the second side portion.

14. The vehicle of claim 13, further comprising a first occupant seating area between the first side portion and the third side portion and a second occupant seating area between the third side portion and the second side portion.

15. The vehicle of claim 13, wherein the vehicle roof includes a pair of roof rails spaced cross-vehicle from each other, the front portion extending from the one roof rail to the other roof rail, the first side portion being adjacent one of the roof rails and the second side portion being adjacent the other of the roof rails, and the third side portion being between the roof rails.

16. The vehicle of claim 13, wherein the strap extends from the first side portion to the third side portion and a second strap extends from the third side portion to the second side portion.

17. The vehicle of claim 1, wherein the strap extends across a lap of a wheelchair occupant seated in the occupant seating area when the airbag is in the inflated position, the strap being fabric and uninflatable.

18. The vehicle of claim 17, wherein the front portion extends from the vehicle roof to the bottom of the first side portion and from the vehicle roof to the bottom of the second side portion.

19. The vehicle of claim 1, wherein the airbag includes an extension supported by the front portion, the extension extending vehicle-rearward of the front portion and the extension being between the occupant seating area and the front portion.

20. The vehicle of claim 1, wherein:

the strap extends across a lap of a wheelchair occupant seated in the occupant seating area when the airbag is in the inflated position;

the strap is fabric and uninflatable;

the front portion extends from the vehicle roof to the bottom of the first side portion and from the vehicle roof to the bottom of the second side portion; and the airbag defines a space between the strap and the front portion of the airbag.

* * * * *